US012413900B2

(12) United States Patent
Ren et al.

(10) Patent No.: US 12,413,900 B2
(45) Date of Patent: Sep. 9, 2025

(54) AIR-PULSE GENERATING DEVICE WITH RESONANT CHAMBER EMBEDDED THEREIN

(71) Applicant: xMEMS Labs, Inc., Santa Clara, CA (US)

(72) Inventors: Jye Ren, Taipei (TW); Eldwin Jiaqiang Ng, Sunnyvale, CA (US); Jemm Yue Liang, Sunnyvale, CA (US)

(73) Assignee: xMEMS Labs, Inc., Santa Clara, CA (US)

( * ) Notice: Subject to any disclaimer, the term of this patent is extended or adjusted under 35 U.S.C. 154(b) by 0 days.

(21) Appl. No.: 18/931,055

(22) Filed: Oct. 30, 2024

(65) Prior Publication Data

US 2025/0150753 A1 May 8, 2025

Related U.S. Application Data

(60) Provisional application No. 63/681,167, filed on Aug. 9, 2024, provisional application No. 63/547,151, filed on Nov. 3, 2023.

(51) Int. Cl.

| | |
|---|---|
| ***H04R 1/28*** | (2006.01) |
| ***H04R 1/02*** | (2006.01) |
| ***H04R 1/34*** | (2006.01) |
| ***H04R 7/06*** | (2006.01) |

(52) U.S. Cl.
CPC ........... *H04R 1/2811* (2013.01); *H04R 1/023* (2013.01); *H04R 1/345* (2013.01); *H04R 7/06* (2013.01); *H04R 2201/003* (2013.01)

(58) Field of Classification Search
CPC ...... H04R 1/023; H04R 1/2811; H04R 1/345; H04R 7/06; H04R 19/005; H04R 19/02; H04R 2217/03; H04R 2201/003
See application file for complete search history.

(56) References Cited

U.S. PATENT DOCUMENTS

| | | | | |
|---|---|---|---|---|
| 11,172,310 | B2 * | 11/2021 | Liang | H04R 17/005 |
| 12,028,673 | B2 * | 7/2024 | Lo | H04R 19/005 |
| 2021/0178430 | A1 | 6/2021 | Adorno | |
| 2022/0014838 | A1 | 1/2022 | Liang | |
| 2022/0225031 | A1 | 7/2022 | Liang | |
| 2022/0225032 | A1 * | 7/2022 | Liang | H04R 19/02 |
| 2023/0292058 | A1 | 9/2023 | Liang | |

* cited by examiner

*Primary Examiner* — Huyen D Le
(74) *Attorney, Agent, or Firm* — Winston Hsu

(57) ABSTRACT

The air-pulse generating device comprises a film structure, operating at an ultrasonic operating frequency, and a resonant chamber, formed on a side of the film structure. A resonance is formed within the resonance chamber. Due to the resonant chamber, the APG device has a peak on a frequency response of an acoustic property of the APG device at the ultrasonic operating frequency.

19 Claims, 13 Drawing Sheets

AIR-PULSE GENERATING DEVICE WITH RESONANT CHAMBER EMBEDDED THEREIN

CROSS REFERENCE TO RELATED APPLICATIONS

This application claims the benefit of U.S. Provisional Application No. 63/547,151, filed on Nov. 3, 2023. Further, this application claims the benefit of U.S. Provisional Application No. 63/681,167, filed on Aug. 9, 2024. The contents of these applications are incorporated herein by reference.

BACKGROUND OF THE INVENTION

1. Field of the Invention

The present application relates to an air-pulse generating device, and more particularly, to an air-pulse generating device with resonant chamber embedded therein.

2. Description of the Prior Art

Unless otherwise indicated herein, the approaches described in this section are not prior art to the claims in this application and are not admitted as prior art by inclusion in this section.

Speaker driver and back enclosure are two major design challenges in the speaker industry. It is difficult for a conventional speaker to cover an entire audio frequency band, e.g., from 20 Hz to 20 KHz. To produce high fidelity sound with high enough sound pressure level (SPL), both the radiating/moving surface and volume/size of back enclosure for the conventional speaker are required to be sufficiently large.

Air-pulse generating (APG) device has been disclosed to overcome the design challenges faced by conventional speakers. However, previously disclosed APG device produces pulses of air flow. For sound producing applications (or air movement application), there is a need to convert such air flow into air pressure efficiently.

SUMMARY OF THE INVENTION

It is therefore a primary objective of the present application to provide an air-pulse generating device, to outperform over the prior art.

An embodiment of the present application provides an air-pulse generating device. The air-pulse generating device comprises a film structure, operating at an ultrasonic operating frequency; and a resonant chamber, formed on a side of the film structure. A resonance is formed within the resonance chamber. Due to the resonant chamber, the APG device has a peak on a frequency response of an acoustic property of the APG device at the ultrasonic operating frequency.

These and other objectives of the present invention will no doubt become obvious to those of ordinary skill in the art after reading the following detailed description of the preferred embodiment that is illustrated in the various figures and drawings.

DETAILED DESCRIPTION

The following inventions filed by Applicant are included herein by reference: U.S. Pat. No. 11,323,797 for dynamic vent (DV), U.S. Pat. No. 11,943,585 for air-pulse generating (APG) device, and application Ser. No. 18/829,245 for tooth-shaped flap edges.

For an APG device, a pair of opposite flaps (e.g., flaps 101, 103 in U.S. Pat. No. 11,943,585 or shown in FIG. 1 or FIG. 2), fabricated by etching a membrane layer made of silicon or other suitable material, are actuated by applying a voltage across a piezoelectric material, such as PZT, deposited atop the pair of flaps. The pair of opposing flaps are made to produce both a common mode motion with a signal SM and a differential mode motion with a pair of signals±SV, performing the function of ultrasonic modulation and demodulation, respectively. This ultrasonic modulation and demodulation to baseband results in an air mass movement through the virtual valve 112 between the flap pair 101-103 at the baseband frequency. This air pump may be used as an audio speaker for the generation of an audio sound wave by pumping air bidirectionally at audio frequencies, or as unidirectional air pump for other applications such as forced air cooling.

The airflow through the valve increases with the pressure difference across the valve. The instantaneous pressures on each side of the valve are generated by the movement of the flap, compressing or expanding the air locally. To increase the flow through the valve 112, caps with outlets positioned over the flaps have been described in U.S. Pat. No. 11,943,585, where the cap creates a small chamber of dimensions much smaller than a wavelength near the flaps, with a small outlet to limit the air flow. This causes a higher level of air compression/expansion within the chamber and increases the pressure differential across the valve, resulting in greater air flow. This cap is not strictly necessary, as disclosed in U.S. Pat. No. 11,943,585, where substantial air flow can still be achieved without a cap.

Figure 1:
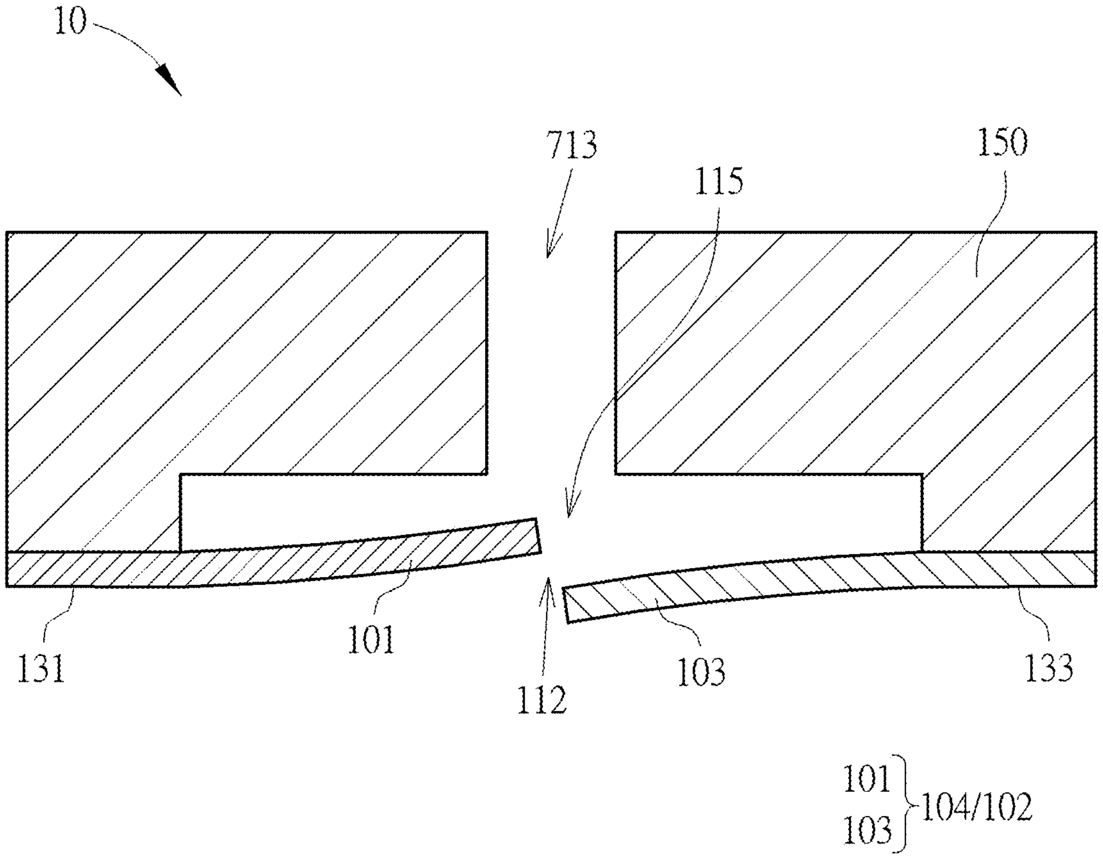
FIG. 1 is a schematic diagram of an air-pulse generating device according to an embodiment of the present application.
Figure 2:
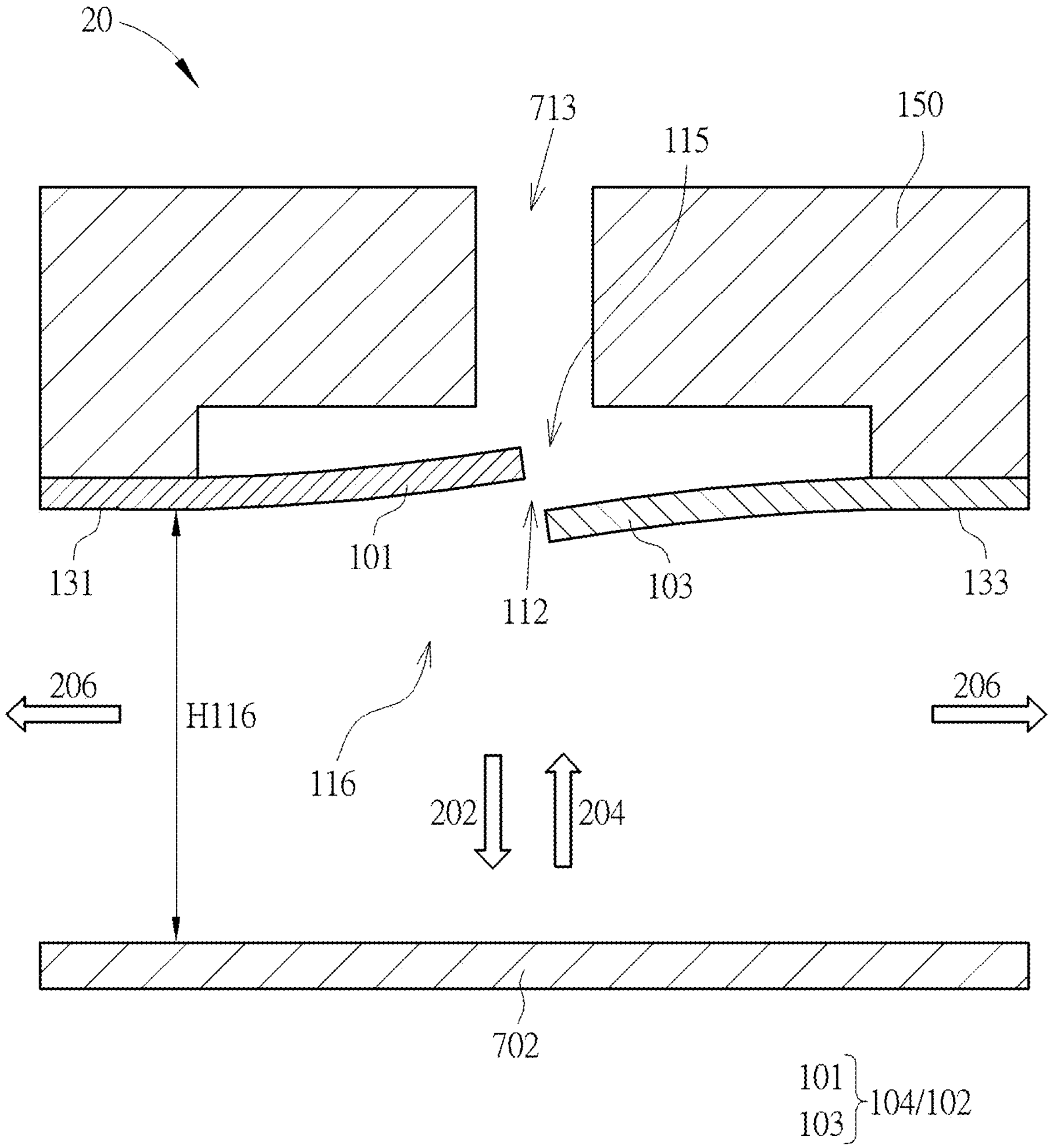
FIG. 2 is a schematic diagram of an air-pulse generating device according to an embodiment of the present application.

Instead of restricting airflow to and from the compression chamber, an alternative method of increasing the pressure change locally around the valve is presented here. Resonant air cavities may be designed on either or both sides of the flaps to boost the local ultrasonic pressure by trapping the ultrasonic energy within the cavity. The resonance may be a Helmholtz resonance or a standing wave resonance. A Helmholtz resonance occurs at a specific frequency when the air mass in the outlet forms a mass-spring system with the volume of air in the chamber that acts as a spring. Standing wave resonances occur when acoustic reflectors are positioned at preferred distances from the flaps, such that acoustic waves bounce at the reflectors, with the reflected and incident waves adding in superposition to form regions of constructive interference with high amplitude oscillating pressures (antinodes) and regions of destructive interference with minimal pressure (nodes). FIG. 1 or FIG. 2 shows one embodiment where a pair of flaps 101 and 103 have a Helmholtz resonant chamber 115 on one side with an outlet 713. On the other side, in FIG. 2, a standing wave cavity 116 is designed with an acoustic reflector 702 spaced a distance H116 from the flaps.

In the present application, the term "chamber" and "cavity" are used interchangeably.

As taught in U.S. Pat. No. 11,943,585, APG devices 10 and 20 shown in FIG. 1 and FIG. 2 comprise a film structure 104, the film structure 104 comprises a flap pair 102, and the flap pair 102 comprises flaps 101 and 103. The flaps 101 and 103 have anchor portions 131 and 133, respectively. The flap pair 102 performs differential mode motion to form an opening 112 or a virtual valve 112, where "virtual valve" is used to emphasize the capability of the flap pair being controlled to be opened or closed, while "opening" is to emphasize the status of the flap pair especially when the virtual valve is opened.

The common-mode displacement of the flaps 101 and 103 at the ultrasonic modulation/operating frequency by common mode signal SM generates an ultrasonic pressure bidirectionally outwards from the flaps to the cavities 115 and 116, but with opposite polarity in each direction. The effect of the Helmholtz or standing wave resonances is to increase ultrasonic pressure magnitude, while maintaining the opposite polarity across the flaps. The flaps are also driven at the same time with a differential mode signal±SV superimposed on the common-mode signal, leading to the opening of the virtual valve 112. The opening of the valve 112 is aligned in time to the pressure difference generated by the common-mode displacement, such that the pressure difference across the flaps causes a net air flow through the valve 112 within an ultrasonic cycle of the common-mode displacement.

In an embodiment, the ultrasonic modulation/operating frequency of common mode signal (or modulation driving signal) SM may be 192 kHz; while the demodulation frequency of differential mode signal (or demodulation driving signal) SV may be 96 kHz, half of the ultrasonic modulation/operating frequency, due to the differential mode motion.

Details of operational principles of flap pair driven by common/differential mode signal SM/SV and performing common/differential mode motion and (de) modulation operation to produce ultrasonic pulses are introduced in U.S. Pat. No. 11,943,585, which would not be narrated herein for brevity. In addition, demodulation signal SV may be obtained from driving circuit disclosed in U.S. application Ser. No. 18/396,678, and modulation signal SM may be obtained from driving circuit disclosed in U.S. Pat. No. 12,107,546, details of which are also not narrated herein for brevity.

In addition, the APG device 10/20 also comprises a covering structure 150, within which the outlet 713 is formed. The covering structure 150 may be lid, cap, etc. The covering structure 150 may be 3D printed or made of metal or Silicon, e.g., via semiconductor manufacturing process, which is not limited thereto. As FIG. 1 and FIG. 2 show, the Helmholtz resonant chamber 115 is formed between the film structure 104 and the covering structure 150. The outlet 713 and the Helmholtz resonant chamber 115 are connected with each other.

Helmholtz Resonances

An acoustic simulation of a Helmholtz chamber (FIG. 3) shows the pressure magnitude distribution near the Helmholtz resonance due to an input velocity at the base of the chamber 115, representing the locations of flaps 101 and 103. It is seen that the pressure magnitude is high inside the chamber, decreasing in the outlet going outwards. FIG. 4 shows the input acoustic impedance as a function of frequency looking into the chamber from the location of the input volume velocity, or simply input velocity. The acoustic impedance's maximum in this case corresponds to the Helmholtz mode (in this example designed to be around 192 kHz, the ultrasonic operating frequency), and may be designed to be near to the common-mode signal (e.g., SM) frequency by controlling the dimensions of the cavity and outlet. Maximizing the acoustic impedance at the ultrasonic operating frequency minimizes the ultrasonic energy propagating outwards from the flaps, and maximizes the pressure accumulation near the virtual valve and hence the air flows through the valve as desired. At the same time, the ultrasonic impedance of the resonant cavity at baseband frequencies should be kept low, typically lower than the other impedances of the system (such as the valve, or connected acoustic chambers), so as not to impede the baseband airflow.

Figure 3:
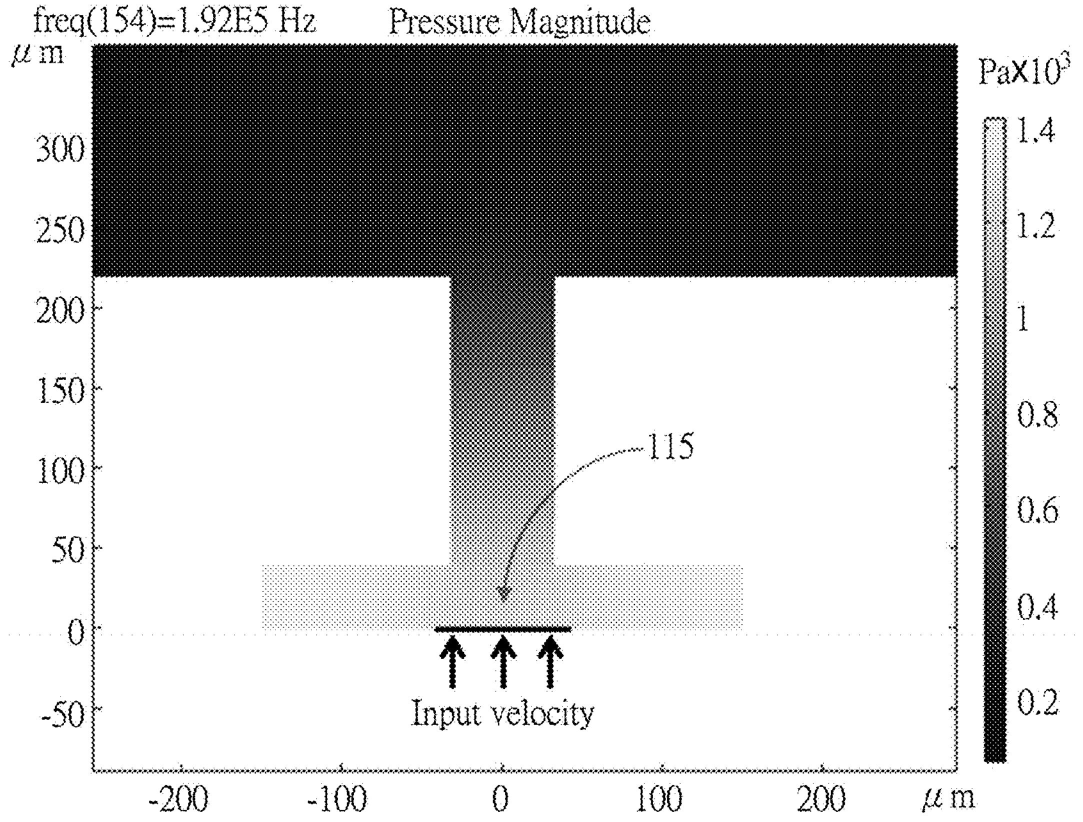
FIG. 3 illustrates a resonant chamber according to an embodiment of the present application.
Figure 4:
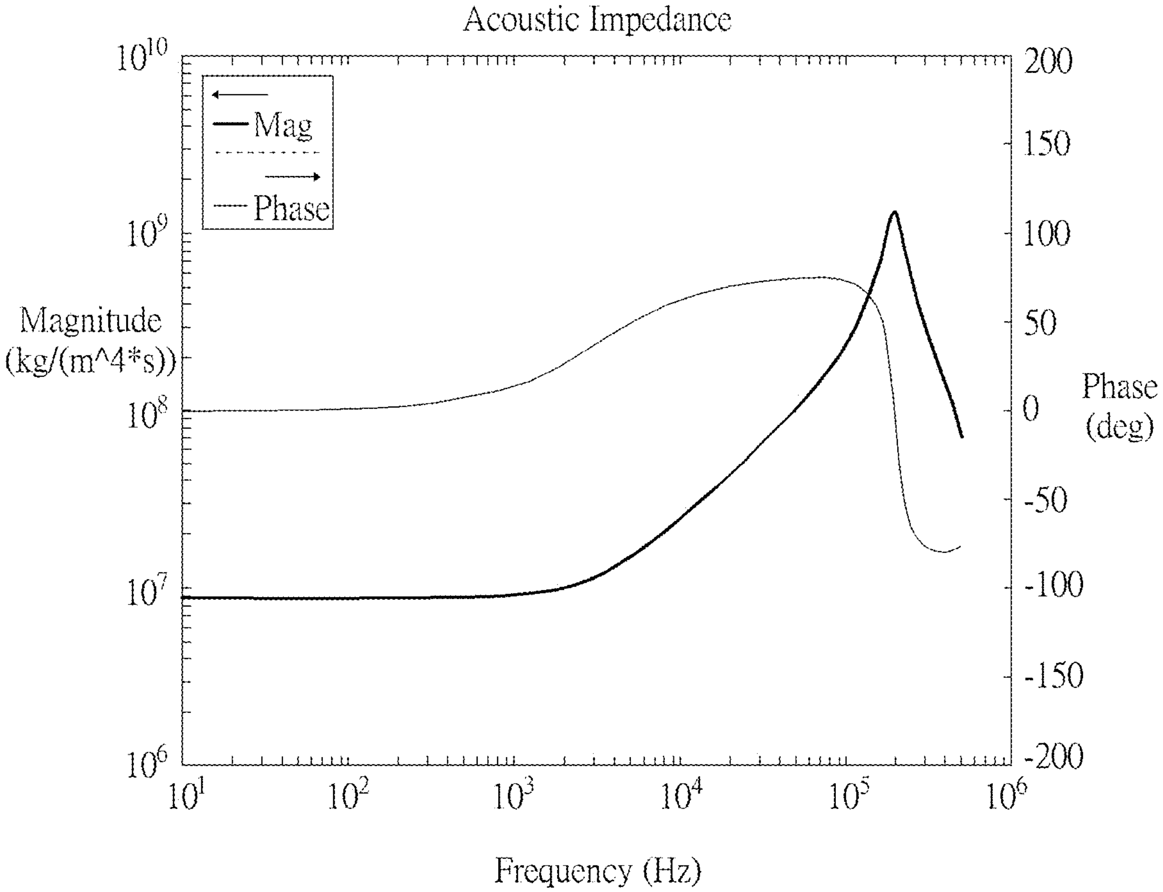
FIG. 4 illustrates a frequency response of a resonant chamber according to an embodiment of the present application.

From FIG. 3 and FIG. 4, it can be validated that the Helmholtz resonant chamber would cause a peak on a frequency response of acoustic impedance of the APG device (e.g., 10 or 20) at the ultrasonic operating frequency (e.g., 192 kHz).

Standing Wave Resonances

Standing wave reflectors may also be used to improve the air flow. The common-mode ultrasonic wave generated by the flaps 101 and 103 (FIG. 2) bounces off the reflector 702 and sums in superposition with the subsequent cycles of the ultrasonic wave being generated by the flaps. These bounces cause a resonance to build up in the cavity, leading to an amplification of the pressure and an increased airflow through valve 112. The optimal distance H116 of the reflector 702 from the plane of the flaps 101, 103 is determined largely by the ultrasonic wavelength in air.

In one embodiment, the reflector 702 is a hard rigid wall with a characteristic acoustic impedance much higher than that of air. Upon traveling in direction 202 and reaching the reflector, an ultrasonic wave is reflected with no change in polarity in the direction 204; for in-phase summation of the pressure at the flaps, the total two-way distance between the flaps and the reflector should be a multiple of a wavelength λ corresponding to the ultrasonic operating frequency, and hence the optimal distance H116 between the reflectors and the flaps should be approximately Nλ/2, where N is a positive integer.

Figure 5:
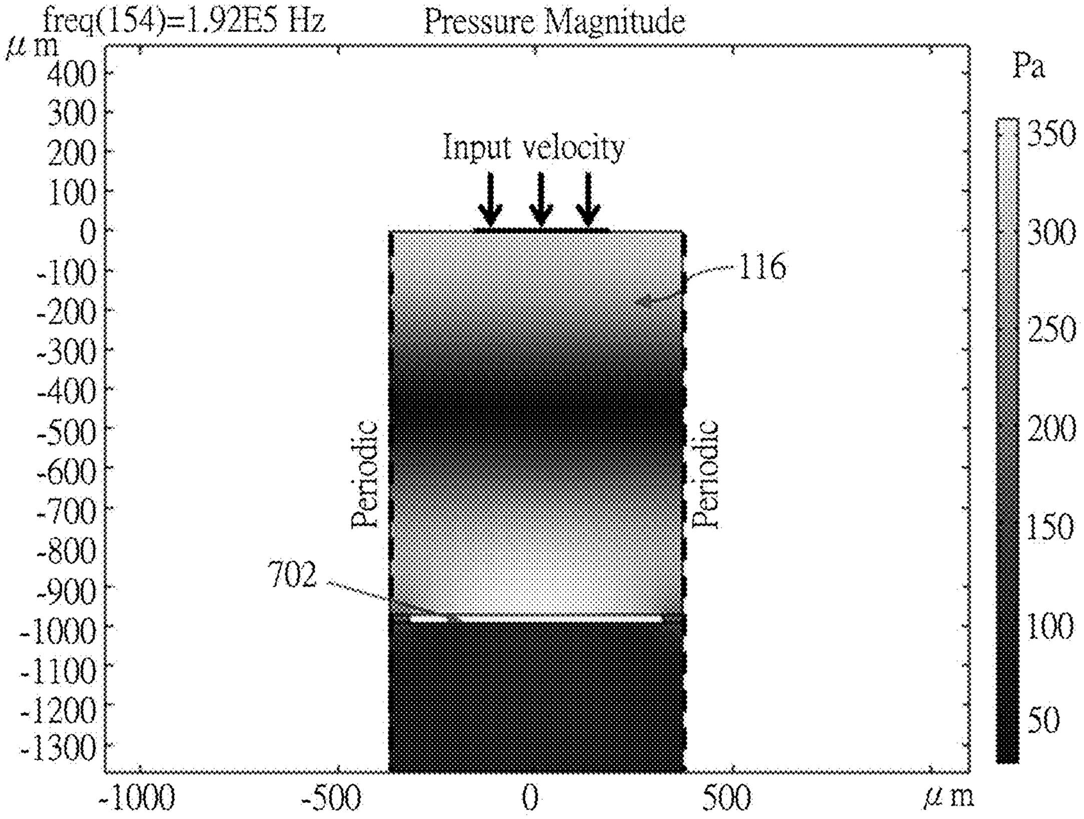
FIG. 5 illustrates a resonant chamber according to an embodiment of the present application.
Figure 6:
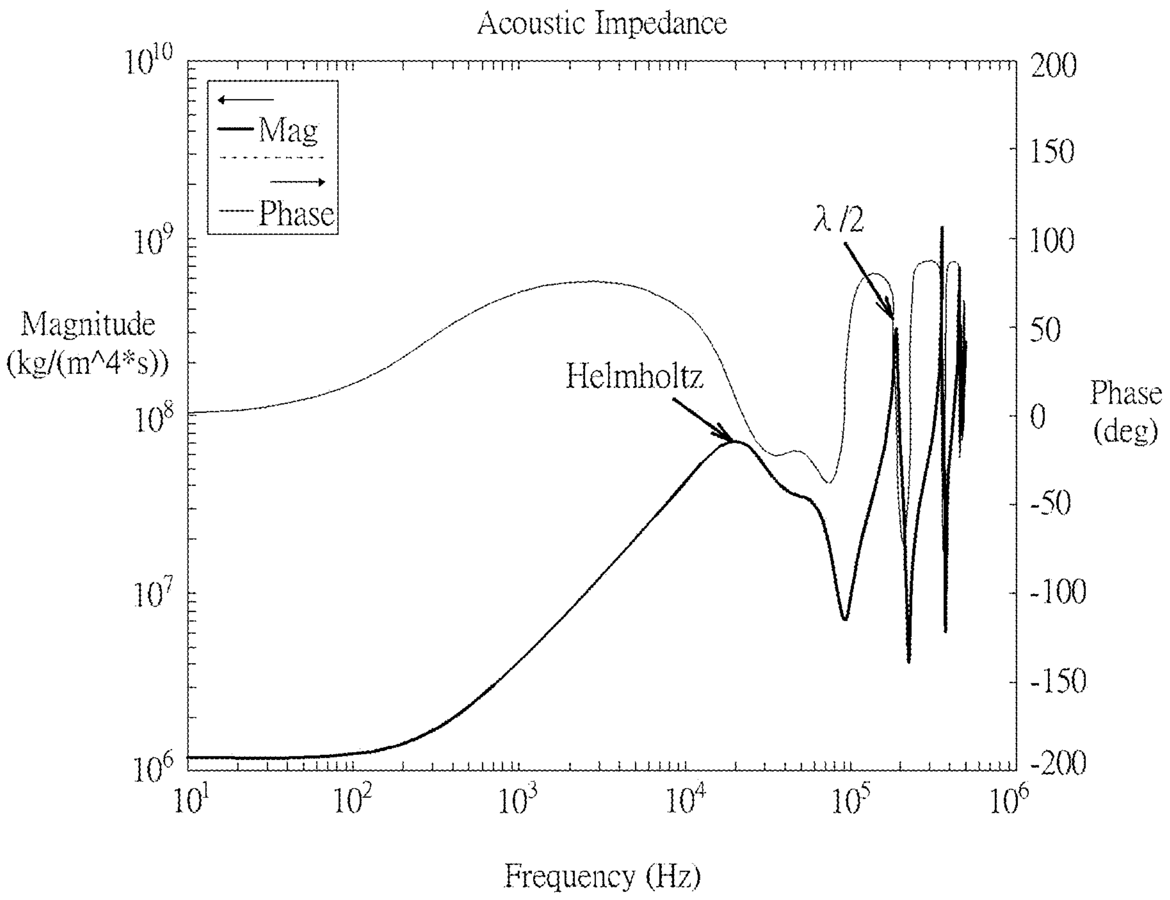
FIG. 6 illustrates a frequency response of a resonant chamber according to an embodiment of the present application.

FIG. 5 shows the pressure magnitude distribution for a simulated standing wave cavity with N=1, where the high-pressure antinodes are at the plane of the flaps and the reflector 702, while the low-pressure node is in the center of the cavity. Periodic boundary conditions are used to simulate an array of such flaps, and small outlets are placed in the reflector 702, though other possibilities for the outlets exist as described in the Directivity section below. The input acoustic impedance as seen from the location of the input velocity as a function of frequency (FIG. 6) shows several peaks, with the first corresponding to the Helmholtz mode, and the second corresponding to the λ/2 standing wave mode near the common-mode frequency, in this case 192 KHz. The impedance dip at approximately 96 kHz corresponds on the other hand to the destructive interference, which is useful for further suppressing the differential-mode pressure generated by the valve motion as described previously in U.S. Pat. No. 11,943,585.

It is noted that the standing wave configuration may be designed to have a higher quality factor (sharper impedance peak) than the Helmholtz configuration, depending on the outlet configuration. Since the standing wave configuration does not require narrow walls, viscous losses can be reduced significantly. Emission (loss) of ultrasound may be reduced by positioning outlets to the side instead of on the reflector, as discussed in the directivity section below. This is beneficial for containing a larger proportion of the ultrasonic energy within the cavity with less dissipation. However, the higher quality factor may result in the pressure taking more time to reach the steady-state level, and may also increase sensitivity to changes in the resonant frequency due to temperature, humidity, or other factors. However, in the presence of an open valve (not included in the acoustic impedance simulation), air flows through the valve decrease the quality factor, and can be significantly lower than that shown in FIG. 6.

The resonant frequency of standing waves may be affected by the presence of holes, or other outlets, as are necessary for air flow at baseband, and deviate from the given Nλ/2 condition. The anchor regions 131 and 133 of the flaps also present a different acoustic impedance to the ultrasonic wave compared to the movable flaps and together affect the optimal distance for resonance.

Increased Conversion of Ultrasound to Baseband

Ultrasonic waves contained by either Helmholtz or standing waves boost the local ultrasonic acoustic pressure difference, resulting in a higher airflow at baseband frequencies. When the valve is opened, air flows across the valve from the cavity on one side to the other side, resulting in a damping or loss mechanism that reduces the pressure gain, or lowers the quality factor from that shown in FIGS. 4 and 6, where the effect of the valve is not modeled. Nonetheless, this achieves the desired goal of an increased conversion from an ultrasonic wave to the baseband wave, or the demodulation efficiency. It is thus beneficial to design air cavities with high acoustic impedances at the common-mode operation frequency.

At the same time, another resulting effect is that the emission of undesired ultrasonic frequencies is reduced. In U.S. Pat. No. 11,943,585, the emitted ultrasonic wave is emitted and not recaptured as described here, resulting in an undesirable strong ultrasonic wave emitted in conjunction with the baseband wave. For health safety reasons, it is often desired that the emitted ultrasound energy be limited to certain threshold levels; this increased ultrasound-to-baseband conversion serves at the same time to boost the baseband output as well as to reduce potentially harmful emission of high amplitude ultrasound.

Directivity

For standing wave resonances, as the wavelength of the ultrasonic wave is significantly smaller than that of the baseband wave, the ultrasonic wave has a much higher directivity compared to the baseband wave. When the dimension of the flaps or an array of flaps 101 and 103 is larger than the wavelength of the ultrasonic wave, the ultrasonic wave propagates towards the reflectors with minimal spreading losses sideways. Conversely, the demodulated baseband wave, which is at much lower frequencies, propagates similarly to a spherical wave, with more of the acoustic energy directed sideways in directions 206 in FIG. 2. As such, slits, holes, or other openings in or around the reflector can be designed off-axis referenced to the ultrasonic wave, to simultaneously enable the containment of the ultrasonic wave as well as the transmission of the baseband wave from these openings. Large openings around the perimeter may be desirable for maintaining high baseband airflow. This allows for greater design freedom, since the openings may be designed for baseband, decoupled from the ultrasound requirements. Compared to the outlets described in U.S. Pat. No. 11,943,585, or even the Helmholtz chamber described above, where small, narrow outlets are necessary to contain the ultrasound wave but also result in significant resistive losses, standing wave acoustic cavities may be designed to have much larger openings for low baseband losses while keeping the ultrasound trapped within the cavity.

Various Embodiments

Figure 7:
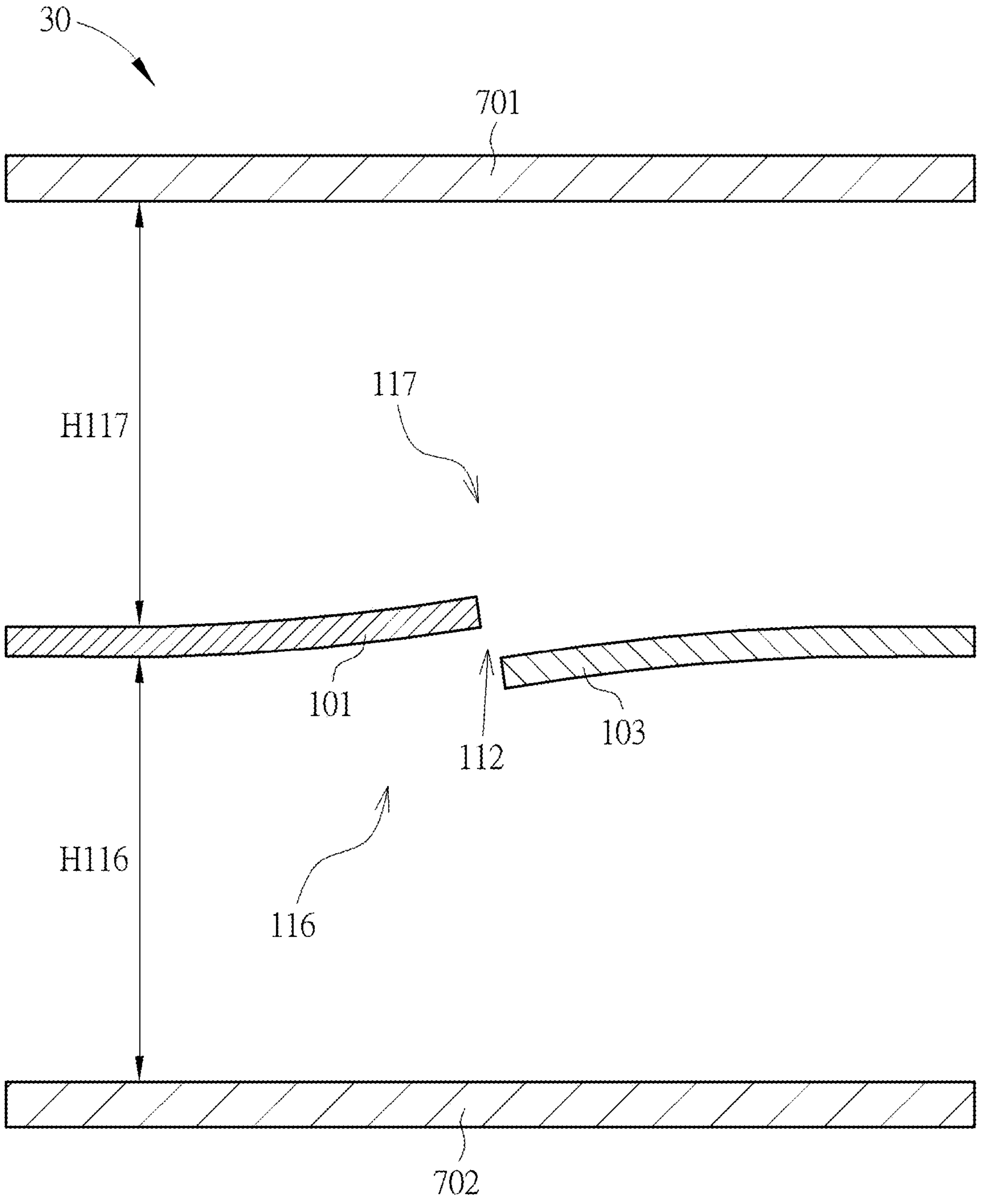
FIG. 7 is a schematic diagram of an air-pulse generating device according to an embodiment of the present application.

Other embodiments may have standing wave resonance cavities or Helmholtz chambers on a single side of the flaps, or on both sides. A configuration with standing wave cavities on both sides is shown in FIG. 7 (in which an APG device 30 is illustrated), with standing wave resonant cavities (116, 117) and reflectors 701, 702 on each side of the flaps. The distances H116 and H117 may each be close to the Nλ/2 condition, subject to the other effects affecting the frequency. This embodiment may be preferable from the fabrication perspective as it does not require a chamber with three-dimensional patterns with small features to be fabricated and assembled together.

Figure 8:
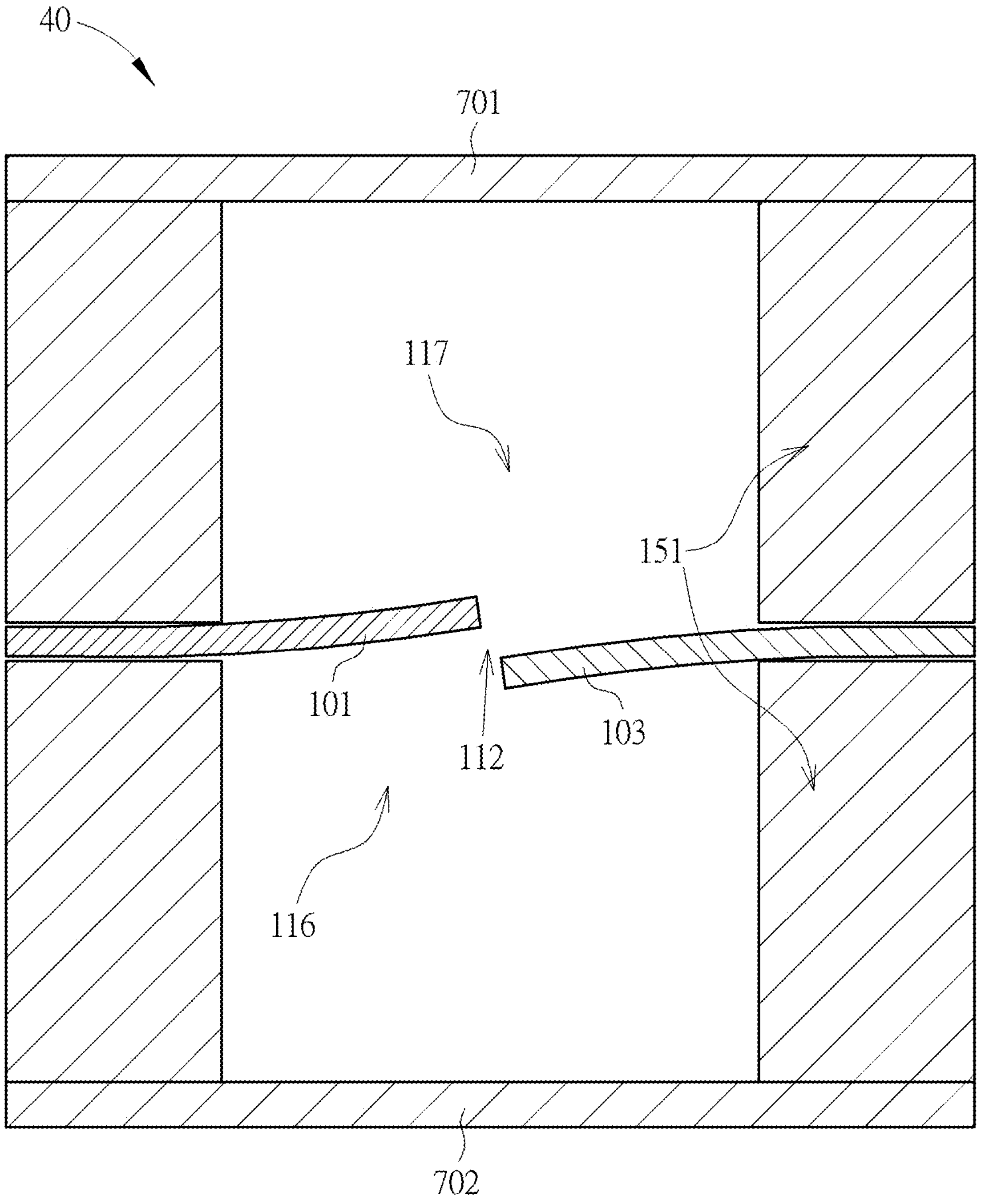
FIG. 8 is a schematic diagram of an air-pulse generating device according to an embodiment of the present application.

Standing wave cavities may also be partially filled with a solid material (e.g., 151 shown in FIG. 8, in which an APG device 40 is illustrated) to constrain the acoustic wave laterally to a smaller region, such as that directly above the valve. The local air pressure is generated by the displacement of the flaps—for a given displacement, the lateral volume reduction of cavities 116 and 117 results in larger pressure changes that are beneficial for airflow through the valve. Since the pressure wave is constrained and can be directed close to the valve, the reflected ultrasonic wave bounces on non-effective areas like the anchor and flap regions close to the anchor are minimized. This has the effect of improving the speed at which the ultrasonic energy is converted to baseband (requiring fewer bounces, having a lower quality factor, but still attaining high airflow), and is advantageous for attaining high sound pressure levels at high frequencies with a minimal delay or decay time. Moreover, the filling material may also confer better structural rigidity for the reflectors. However, the cavities should be sufficiently wide to avoid increasing the viscous resistance of the airflow, leading to undesirable acoustic losses. To allow baseband airflow in this embodiment, openings in the reflectors 701 and 702 or the walls 151 may be spaced in the out-of-page direction.

Soft boundary ultrasonic reflectors may also be considered for standing waves. Channeling the ultrasonic wave through a narrow slot with a width (W715 and W716 of outlets 715 and 716 in FIG. 9, in which an APG device 50 is illustrated) much smaller than the wavelength into an open space can present an impedance mismatch at the open boundary at the end of the slot, causing the ultrasonic wave to flip polarity during reflection at the slot-to-open boundary—in such a case, the optimal distance from the flaps 101 and 103 to end 703/704 is approximately $\lambda(N/2+1/4)$, where end 703/704 may refer to an end of channel 715/716. The fundamental wavelength here is $\lambda/4$, compared to the rigid reflector which requires a distance of $\lambda/2$, and may thus result in a lower profile device.

Figure 9:
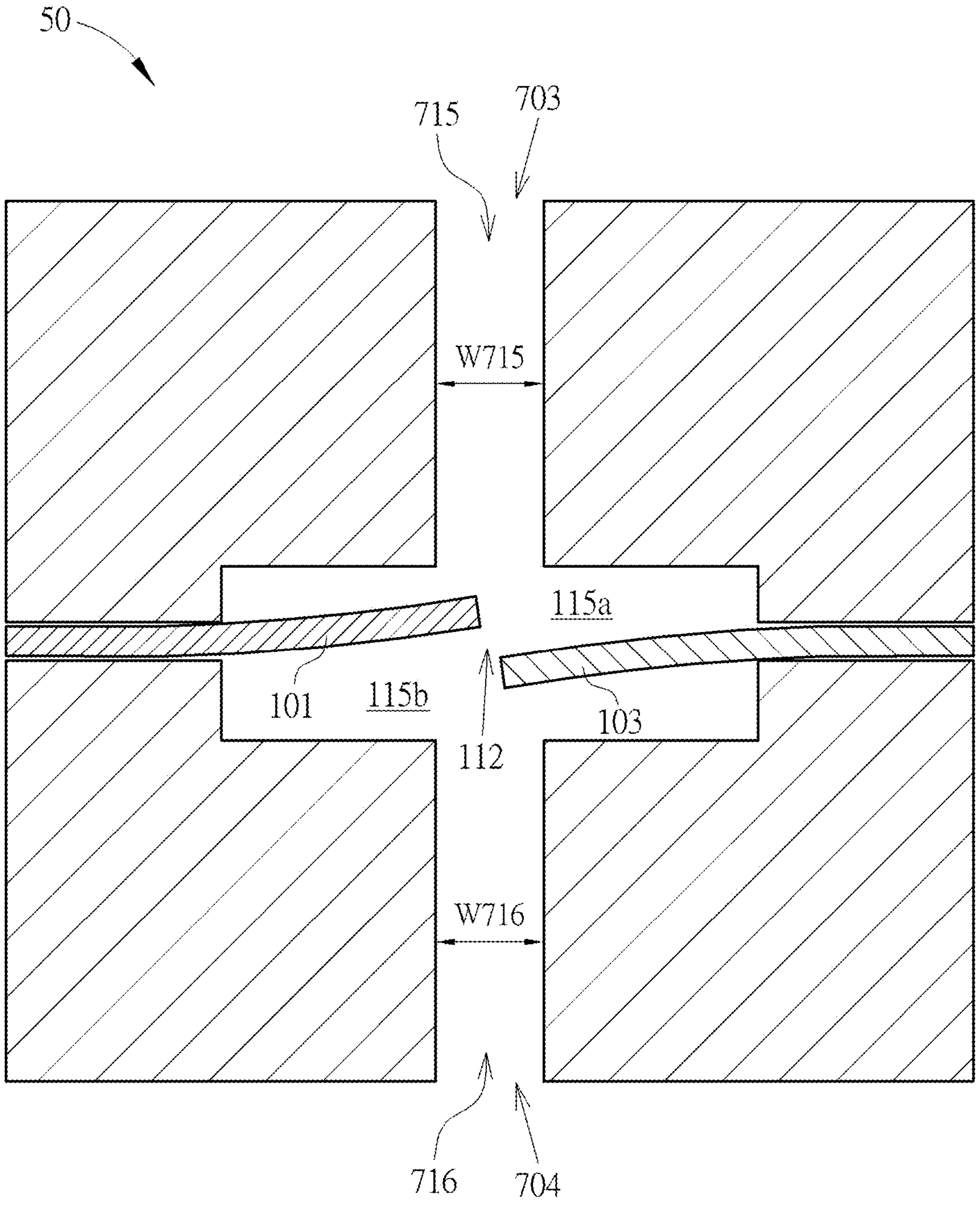
FIG. 9 is a schematic diagram of an air-pulse generating device according to an embodiment of the present application.

Note that, the APG device 50 in FIG. 9 may comprise resonant chambers 115*a* and 115*b*. In an embodiment, the resonant chambers 115*a* and 115*b* may be Helmholtz resonant chambers, but not limited thereto.

Figure 10:
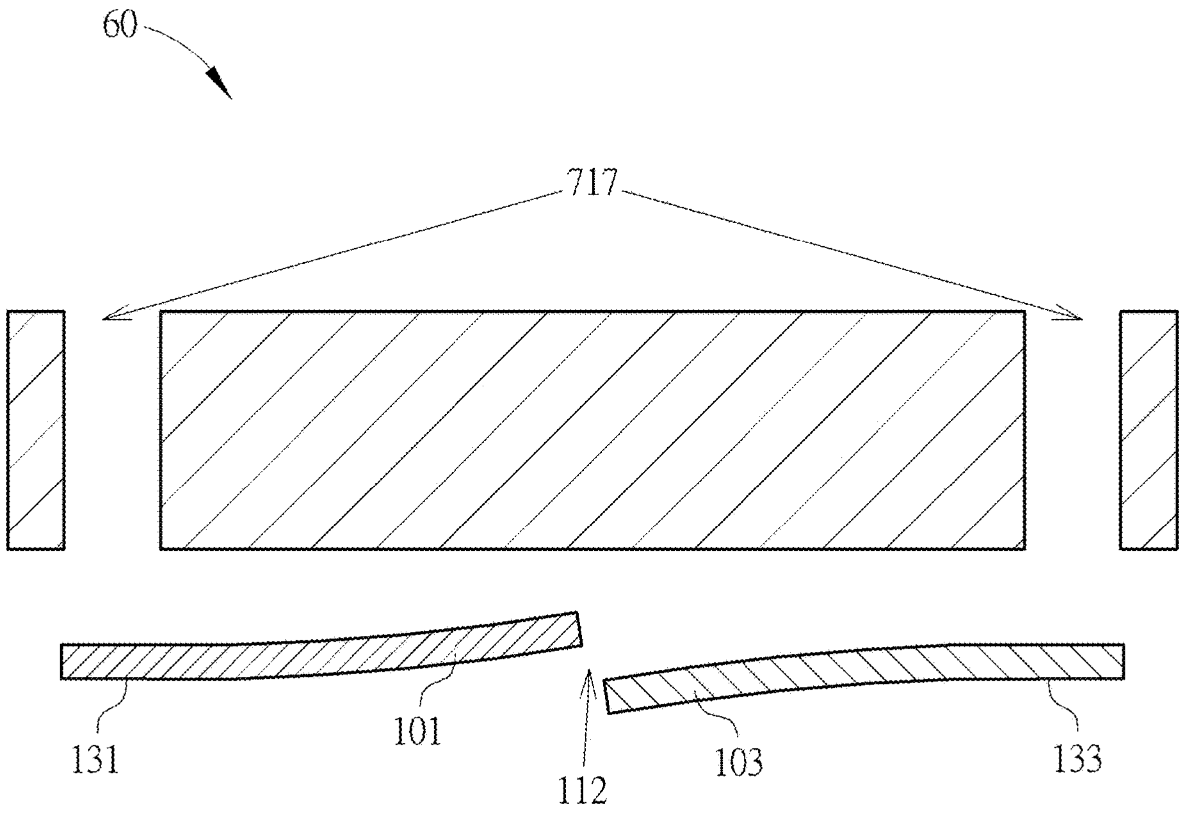
FIG. 10 is a schematic diagram of an air-pulse generating device according to an embodiment of the present application.

While the Helmholtz chamber shown in FIG. 1 and FIG. 2 has the outlet directly over the flaps 101 and 103, the outlets could also be positioned elsewhere. FIG. 10 shows the outlets 717 positioned over the anchors (or anchor portions) 131 and 133 instead of the flaps. The acoustic impedance may still be tuned to maximize the impedance at the ultrasonic common-mode frequency. In this situation, there does not need to be a wall between adjacent flap pairs, which may be provide ease of fabrication.

Construction

The resonant cavity walls may be fabricated from a solid material that forms part of the speaker module, such as the printed circuit board or copper traces used for electrical routing, or a lid (e.g. stainless steel, brass) used for protection from mechanical, chemical, dust or other unwanted substances. They could also be designed as part of the structural assembly, such as in earbuds or headphones. In such cases, there is little added cost for integrating such an acoustic resonant cavity.

Non-rigid, flexible reflectors are also viable, and may be made of polymers (e.g. polyimide, polyethylene, and polyvinyl chloride, which may be easily added to the speaker package at low cost. The optimal location for these flexible reflectors may vary due to the mass and stiffness contributions.

The standing wave reflectors may also have a slight concave curvature towards the flaps 101, 103 or have the ends curved inwards to aid in constraining the ultrasonic wave within the cavity.

Figure 11:
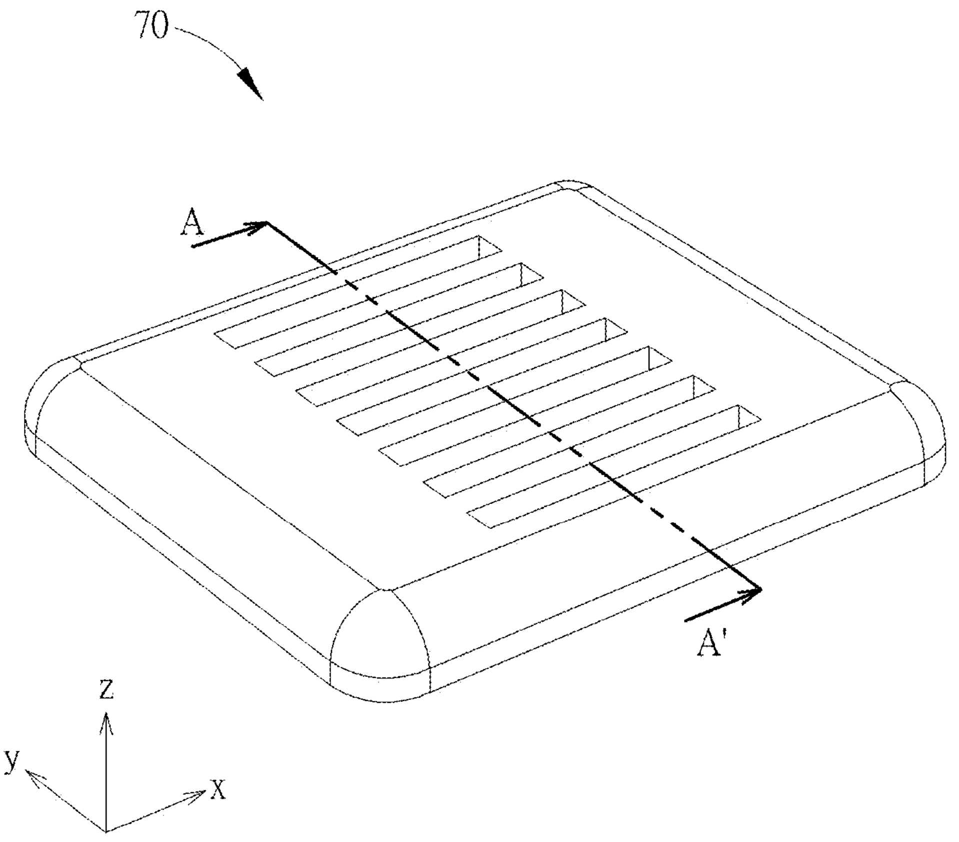
FIG. 11 is a schematic diagram of an air-pulse generating device according to an embodiment of the present application.
Figure 12:
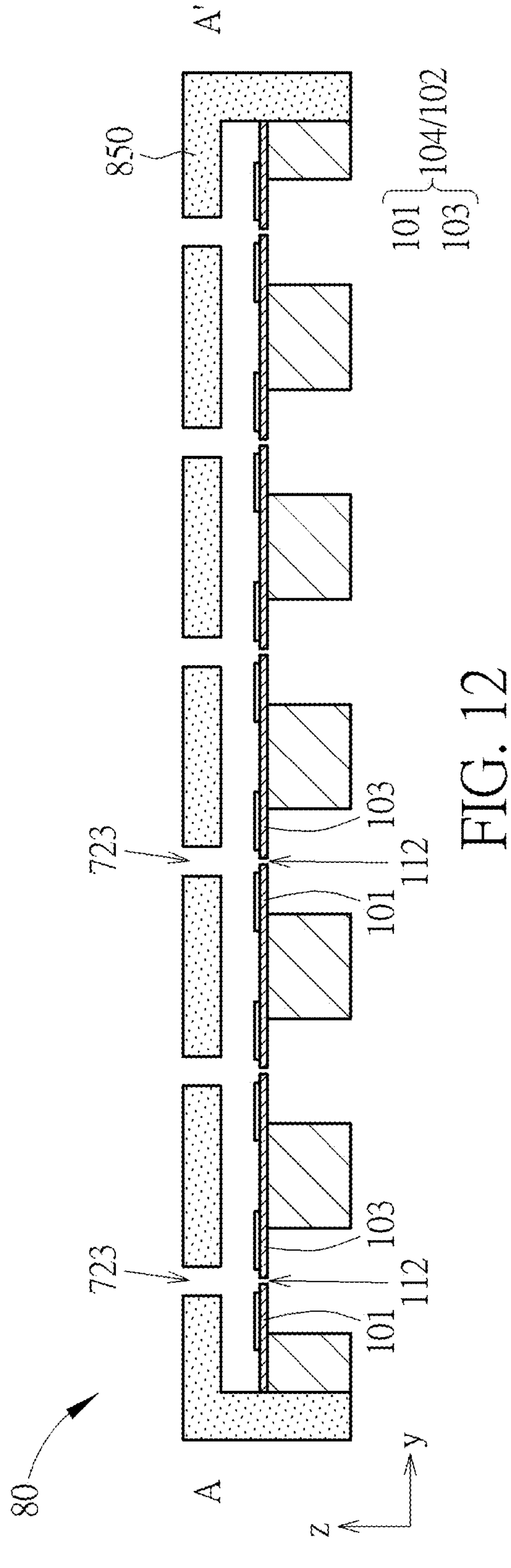
FIG. 12 is a schematic diagram of an air-pulse generating device according to an embodiment of the present application.
Figure 13:
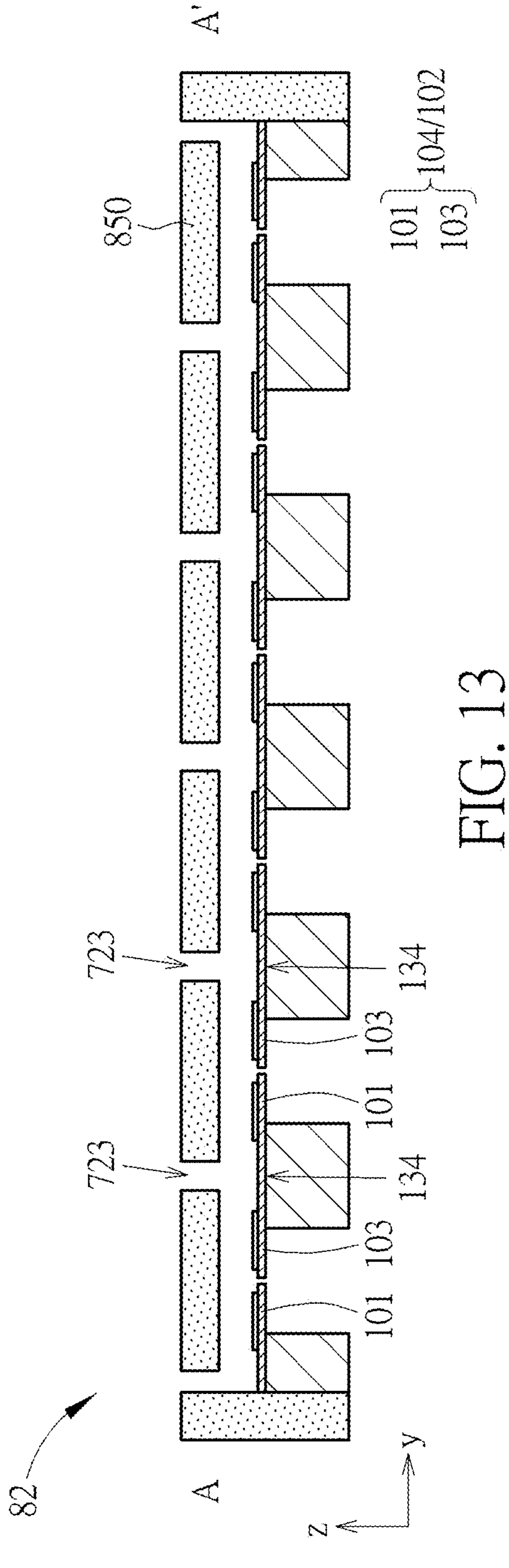
FIG. 13 is a schematic diagram of an air-pulse generating device according to an embodiment of the present application.

Moreover, APG device of the present invention may comprise multiple outlets and flap pairs. For example, FIG. 11 illustrates an appearance of an APG device 70 or a covering structure according to an embodiment of the present invention. The APG device 70 may have multiple outlets formed on the covering structure (e.g., lid or cap). FIG. 12 and FIG. 13 illustrate cross sectional view of APG devices 80 and 82 according to embodiment of the present invention. The APG devices 80 and 82 comprise a plurality of flap pairs 102 and a plurality of outlets 723. In FIG. 12, the outlets 723 are formed and aligned to (i.e., positioned over) the virtual valves or the openings 112. The APG devices 80 and 82 comprise a plurality of flap pairs 102 and a plurality of outlets 723. In FIG. 12, the outlets 723 are formed and aligned to (i.e., positioned over) anchor portions 134. Between covering structural 850 and film structure 104 of the APG device 80/82, Helmholtz resonant chamber may be formed to enhance air pressure or sound pressure level (SPL) of the APG device 80/82.

Figure 14:
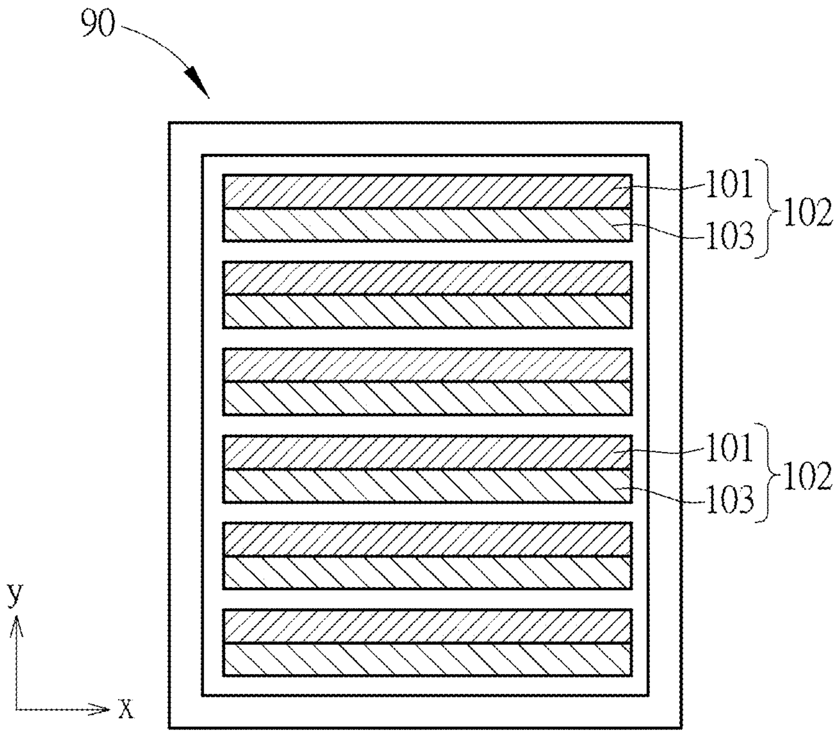
FIG. 14 illustrates a top view of a film structure of an air-pulse generating device according to an embodiment of the present invention.
Figure 15:
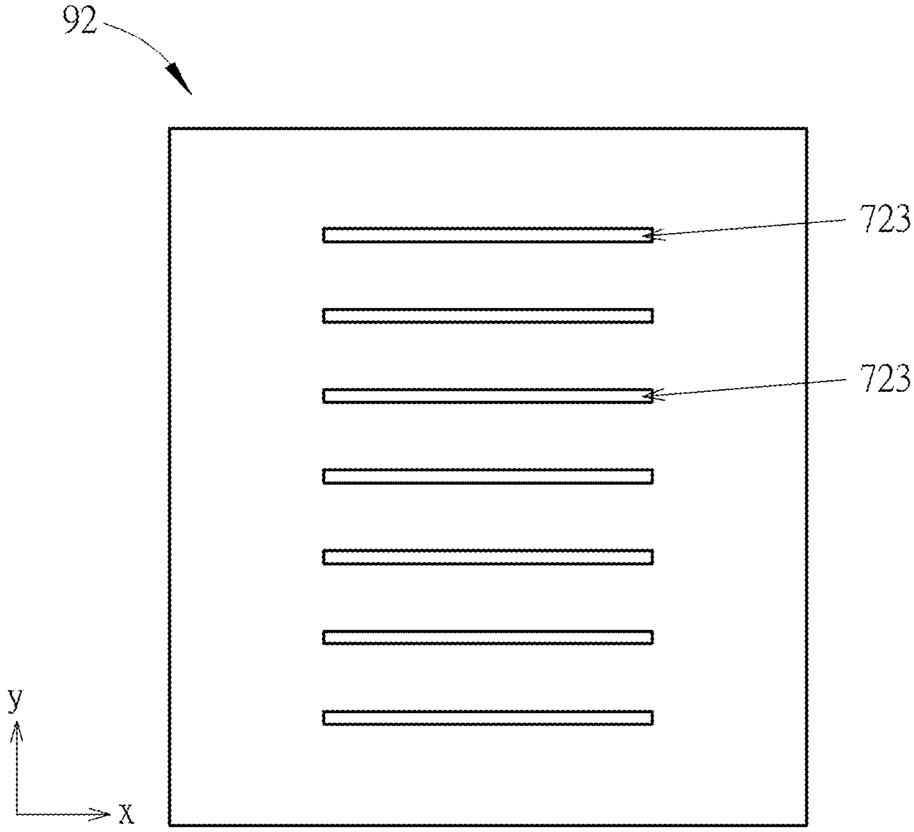
FIG. 15 illustrates a top view of a covering structure of an air-pulse generating device according to an embodiment of the present invention.

FIG. 14 illustrates a top view of a film structure 90 of an APG device according to an embodiment of the present invention, and FIG. 15 illustrates a top view of a covering structure 92 of an APG device according to an embodiment of the present invention. The film structure 90 and the covering structure 92 may be applied to the APG devices 80 and 82. Alignment of the outlets 723 with respect to the flap pairs 102 may be designed according to practical requirement.

In short, the present invention utilizes resonant chamber(s), bringing a peak on frequency response of acoustic impedance at ultrasonic operating frequency, to produce air pressure efficiently, and thereby enhance sound pressure level (SPL).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An air-pulse generating device, comprising:
- a film structure, operating at an ultrasonic operating frequency; and
- a resonant chamber, formed on a side of the film structure;
- wherein a resonance is formed within the resonance chamber;
- wherein due to the resonant chamber, the APG device has a peak on a frequency response of an acoustic impedance of the APG device at the ultrasonic operating frequency.

2. The APG device of claim 1, wherein the resonance is a Helmholtz resonance.

3. The APG device of claim 1, comprising:
- a covering structure;
- wherein the resonant chamber is formed between the film structure and the covering structure.

4. The APG device of claim 3,
- wherein an outlet is formed within the covering structure and connected with the resonant chamber.

5. The APG device of claim 4,
- wherein the film structure comprises a flap pair configured to perform a differential mode motion to form a virtual valve;
- wherein the outlet is positioned over the virtual valve.

6. The APG device of claim 4,
- wherein the outlet is positioned over an anchor portion of a flap of the film structure.

7. The APG device of claim 1, comprising:
- a first resonant chamber, formed on a first side of the film structure; and
- a second resonant chamber, formed on a second side, opposite to the first side, of the film structure.

8. The APG device of claim 7, comprising:
- a first outlet, connected with the first resonant chamber; and
- a second outlet, connected with the second resonant chamber.

9. The APG device of claim 1, comprising:

a resonant cavity;

wherein the resonant chamber is formed on a first side of the film structure;

wherein the resonant cavity is formed on a second side, opposite to the first side, of the film structure.

10. The APG device of claim 9, comprising:

a reflector;

wherein the resonant cavity is formed between the film structure and the reflector.

11. The APG device of claim 10, wherein a distance between the film structure and the reflector is a half wavelength corresponding to the ultrasonic operating frequency or an integer multiple of the half wavelength.

12. The APG device of claim 1, wherein the resonance is a standing wave resonance.

13. The APG device of claim 1, wherein the film structure comprises a flap pair, configured to perform a common mode motion and a differential mode motion.

14. The APG device of claim 1, comprising:

a first resonant cavity, formed on a first side of the film structure; and a second resonant cavity, formed on a second side, opposite to the first side, of the film structure;

wherein a first standing wave resonance is formed within the first resonant cavity and the second standing wave resonance is formed within the second resonant cavity.

15. The APG device of claim 14, comprising:

a first reflector and a second reflector;

wherein the first resonant cavity is formed between the film structure and the first reflector, and the second resonant cavity is formed between the film structure and the second reflector.

16. The APG device of claim 1, wherein the film structure comprises a plurality of flap pairs and a plurality of outlets.

17. The APG device of claim 16, wherein the plurality of outlets is positioned over a plurality of openings formed via differential mode motions performed by the plurality of flap pairs.

18. The APG device of claim 16, wherein the plurality of outlets is positioned over a plurality of anchor portions of the plurality of flap pairs.

19. The APG device of claim 16, comprising:

a covering structure, wherein the plurality of outlets is formed within the covering structure.

* * * * *